US 008214606B2

(12) United States Patent
Kezuka et al.

(10) Patent No.: US 8,214,606 B2
(45) Date of Patent: Jul. 3, 2012

(54) STORAGE SYSTEM AND CONTROL METHOD THEREOF

(75) Inventors: Teiko Kezuka, Odawara (JP); Yuko Matsui, Odawara (JP); Kenji Muraoka, Odawara (JP); Hisashi Takamatsu, Odawara (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 13/093,460

(22) Filed: Apr. 25, 2011

(65) Prior Publication Data

US 2011/0202717 A1    Aug. 18, 2011

Related U.S. Application Data

(63) Continuation of application No. 12/007,646, filed on Jan. 14, 2008, now Pat. No. 7,953,940.

(30) Foreign Application Priority Data

Apr. 16, 2007    (JP) .................................. 2007-107261

(51) Int. Cl.
G06F 13/00    (2006.01)
G06F 13/28    (2006.01)
G06F 3/00    (2006.01)

(52) U.S. Cl. ................. 711/154; 711/112; 711/E12.002; 710/18

(58) Field of Classification Search .................. 711/154, 711/112, E12.002; 710/18
See application file for complete search history.

(56) References Cited

U.S. PATENT DOCUMENTS

| | | | |
|---|---|---|---|
| 7,039,766 B1 | 5/2006 | Smith | |
| 2002/0095547 A1* | 7/2002 | Watanabe et al. | 711/114 |
| 2005/0097274 A1* | 5/2005 | Ohtani | 711/114 |
| 2005/0114608 A1 | 5/2005 | Oshima et al. | |
| 2006/0184740 A1* | 8/2006 | Ishikawa et al. | 711/129 |
| 2008/0059750 A1* | 3/2008 | Ogawa | 711/170 |
| 2008/0086614 A1* | 4/2008 | Canis et al. | 711/163 |
| 2008/0104431 A1* | 5/2008 | Shimada | 713/300 |
| 2010/0199063 A1* | 8/2010 | Sechrest et al. | 711/204 |

FOREIGN PATENT DOCUMENTS

| | | |
|---|---|---|
| JP | 07-073107 A | 3/1995 |
| JP | 10-240450 A | 2/1997 |
| JP | 11-212733 A | 1/1998 |
| JP | 2001-125754 A | 5/2001 |
| JP | 2003-131814 A | 10/2001 |
| JP | 2002-023962 A | 1/2002 |
| JP | 2004-078491 A | 8/2002 |
| JP | 2006-227688 A | 2/2005 |
| JP | 2006-304526 A | 4/2005 |
| JP | 2005-157711 A | 6/2005 |
| WO | 2005101182 A2 | 10/2005 |

* cited by examiner

*Primary Examiner* — Edward Dudek, Jr.
(74) *Attorney, Agent, or Firm* — Volpe and Koenig, P.C.

(57) ABSTRACT

The plurality of host systems or the plurality of applications include an insertion unit for sending the identifier. The storage controller includes an analysis unit for identifying a host system or an application based on the identifier contained in the access information and analyzing an access pattern of access information sent from the identified host system or application, a management unit for managing the identifier, the analysis result of the access pattern analyzed with the analysis unit, and a control method for controlling the processing of data to be sent from a host system based on the analysis result or data to be stored in a logical volume, and a data processing controller for controlling the processing of data to be sent from a host system or data to be stored in a logical volume according to the control method managed by the management unit.

12 Claims, 17 Drawing Sheets

FIG.2

PATTERN RESULT TABLE

| PATTERN NUMBER | VOLUME NUMBER | HOST SYSTEM NUMBER | APPLICATION | USAGE | PERFORMANCE THRESHOLD | TYPE OF I/O | CYCLE | BOUNDARY | CONTROL METHOD |
|---|---|---|---|---|---|---|---|---|---|
| 1 | 1 | 1 | A | — | 0 | Randam R/W | W-R-W | 0 | DESTAGE AFTER CYCLE |
| 2 | 2 | 2 | A | — | 0 | Seq W | 0 | 0.5 | DISPLAY USAGE INSTRUCTIONS |
| 3 | 1 | 1 | B | LOG | 0 | | 0 | 0 | |

91A 91B 91C 91D 91E 91F 91G 91H 91I 91J

91

USAGE TABLE

| INPUT | | TYPE OF I/O |
|---|---|---|
| DATABASE | TABLE | Random Read |
| | INDEX | Random Read |
| | JOURNAL | Sequential Write |
| | LOG | Sequential Write |
| ARCHIVE | | Sequential Read |

93

LU MANAGEMENT TABLE

| LOGICAL VOLUME NUMBER (94A) | ALIAS (94B) | HOST SYSTEM NUMBER (94C) | CAPACITY (94D) |
|---|---|---|---|
| 1 | STORE MASTER | 1 | 6GB |
| 2 | ARCHIVE DATA | 2 | 2GB |
| 3 | LOG DATA | 3 | 5GB |
| ⋮ | ⋮ | ⋮ | ⋮ |

| TYPE OF I/O | CONTROL METHOD |
|---|---|
| SEQUENTIAL WRITE | • PERFORM OPTIMIZATION BY PREDICTING NECESSARY DATA TO BE PREFETCHED FROM HARD DISK DRIVE TO CACHE MEMORY |
| SEQUENTIAL WRITE | • PERFORM OPTIMIZATION BY PREDICTING NECESSARY DATA TO BE COLLECTIVELY WRITTEN FROM CACHE MEMORY INTO HARD DISK DRIVE<br>• ADJUST STRIPE SIZE ACCORDING TO DATA TRANSFER LENGTH<br>• HAVE HOST SYSTEM SIDE CHANGE DATA TRANSFER LENGTH BASED ON DATA LENGTH CHANGE DRIVER<br>• PREFERENTIALLY DESTAGE ACCORDING TO PERFORMANCE THRESHOLD DESIGNATED BY USER |
| RANDOM READ | • CACHE DATA OF STORAGE AREA PREDICTED TO BE SUBSEQUENTLY READ BASED ON PATTERN<br>• COLLECTIVELY STORE FREQUENTLY READ DATA IN SPARE TIME<br>• HAVE HOST SYSTEM SIDE CHANGE DATA TRANSFER LENGTH BASED ON DATA LENGTH CHANGE DRIVE AND PERFORM OPTIMIZATION OF DATA LENGTH AND NUMBER OF TAGS |
| RANDOM WRITE | • COLLECTIVELY STORE DATA OVERWRITTEN FREQUENTLY AND STORED DISCRETELY IN STORAGE AREA (INCLUDING MIGRATION OF RAID LEVEL)<br>• OPTIMIZE STRIPE SIZE ON STORAGE APPARATUS SIDE<br>• MAKE HOST SYSTEM SIDE CHANGE DATA TRANSFER LENGTH BASED ON DATA LENGTH CHANGE DRIVE |

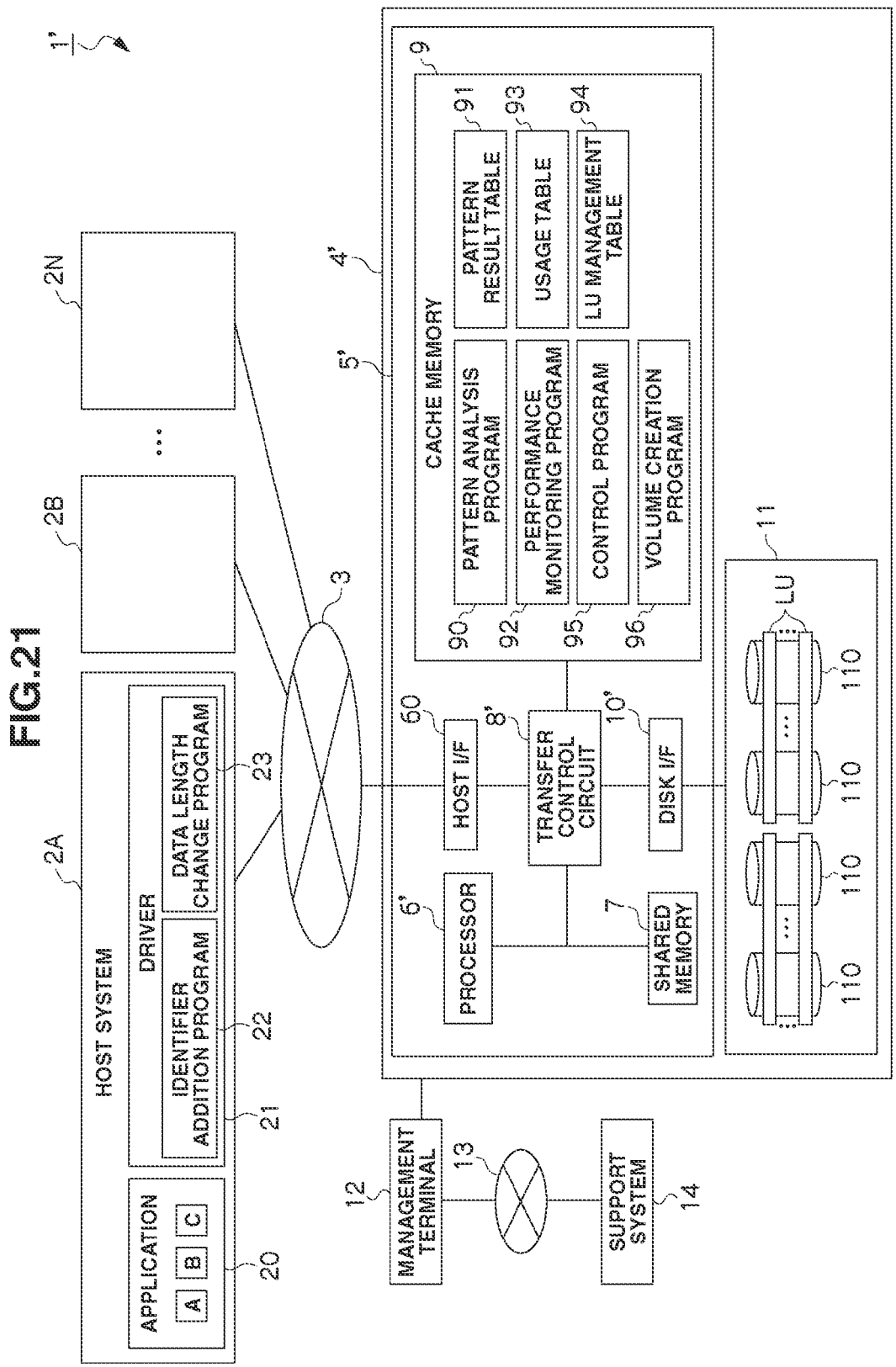

STORAGE SYSTEM AND CONTROL METHOD THEREOF

CROSS REFERENCES

This application claims priority to U.S. application Ser. No. 12/007,646 filed on Jan. 14, 2008 which claims priority from Japanese Patent Application No. 2007-107261, filed on Apr. 16, 2007, the entire disclosure of which is incorporated herein by reference.

BACKGROUND

The present invention generally relates to a storage system and its control method, and in particular can be suitably applied to a storage system that controls a storage controller based on access information from a host system.

Recently, in storage systems that handle vast amounts of data, a storage controller is used for controlling the input and output of data to and from the host system in order to store large-capacity data sent from the host system.

A storage controller has a logical volume (hereinafter referred to as a "logical volume") formed on a physical storage area provided by a plurality of hard disk devices configured to be operated according to a RAID (Redundant Array of Independent Inexpensive Disks) system.

The storage controller performs data processing according to the access pattern information of a read/write request received from the host system.

In relation to the above, disclosed is technology for improving the performance of the overall storage system by increasing the processing speed of data to be performed by the storage controller that received the read/write request.

Japanese Patent Laid-Open Publication No. H10-240450 discloses technology of alleviating the deterioration in the system performance by storing data of low access frequency in an internal storage apparatus even when it is flushed from a cache memory when handling data of a plurality of access patterns in a single cache memory.

Japanese Patent Laid-Open Publication No. H11-212733 discloses technology of alleviating the deterioration in the system performance by a controller controlling a magnetic disk providing information concerning a logical volume to a storage controller, and allocating the cache memory to be prefetched by the storage controller to each logical volume.

Japanese Patent Laid-Open Publication No. 2003-131814 discloses technology of alleviating the deterioration in the system performance by a storage controller allocating its resources based on the characteristics of the access pattern from a host system.

Specification of Japanese Patent Application No. 2006-304526 describes that it is possible to alleviate the deterioration in the system performance by calculating the performance load of a logical volume according to the access pattern from a host system, and rearranging the target volume to be subject to performance load balancing to different RAID groups.

SUMMARY

Since the foregoing conventional storage controllers merely perform data processing according to the access pattern from a host system to a logical volume, there is a problem in that the performance of the storage system would deteriorate depending on the particularity of the access pattern.

Further, the storage controller could not analyze the access pattern from a host system to a logical volume and perform optimal control for the relevant processing.

The present invention was made in view of the foregoing points, and proposes a storage system and its control method capable of improving the performance of a storage system even based on the particularity of access patterns by analyzing the access pattern from a host system to a logical volume and performing optimal control.

In order to achieve the foregoing object, the present invention provides a storage system including a plurality of host systems or a plurality of applications for sending access information, and a storage controller for storing data in a logical volume provided in a storage area of a physical disk. The plurality of host systems or the plurality of applications comprise an insertion unit for inserting an identifier that identifies respective host systems or respective applications into the access information and sending the identifier. The storage controller comprises an analysis unit for identifying a host system or an application based on the identifier contained in the access information and analyzing an access pattern of access information sent from the identified host system or application; a management unit for managing the identifier of the host system or the application, the analysis result of the access pattern analyzed with the analysis unit, and a control method for controlling the processing of data to be sent from a host system based on the analysis result or data to be stored in a logical volume; and a data processing controller for controlling the processing of data to be sent from a host system or data to be stored in a logical volume according to the control method managed by the management unit.

Thereby, the storage controller is able analyze the access pattern from a host system to a logical volume and perform optimal control for the relevant processing.

The present invention further provides a control method of a storage system including a plurality of host systems or a plurality of applications for sending access information, and a storage controller for storing data in a logical volume provided in a storage area of a physical disk. The plurality of host systems or the plurality of applications comprise an insertion step for inserting an identifier that identifies respective host systems or respective applications into the access information and sending the identifier. The storage controller comprises an analysis step for identifying a host system or an application based on the identifier contained in the access information and analyzing an access pattern of access information sent from the identified host system or application; a management step for managing the identifier of the host system or the application, the analysis result of the access pattern analyzed with the analysis unit, and a control method for controlling the processing of data to be sent from a host system based on the analysis result or data to be stored in a logical volume; and a data processing control step for controlling the processing of data to be sent from a host system or data to be stored in a logical volume according to the control method managed at the management step.

Thereby, the storage controller is able analyze the access pattern from a host system to a logical volume and perform optimal control for the relevant processing.

According to the present invention, since the storage controller is able analyze the access pattern from a host system to a logical volume and perform optimal control for the relevant processing, it is possible to seek improvement in performance of the storage system even based on the particularity of access patterns.

DESCRIPTION OF DRAWINGS

FIG. 2 is a chart showing a pattern result table according to an embodiment of the present invention;

FIG. 20 is a list of control methods according to an embodiment of the present invention; and FIG. 21 is a block diagram showing the overall configuration of a storage system according to a second embodiment of the present invention.

DETAILED DESCRIPTION

An embodiment of the present invention is now explained in detail with reference to the attached drawings.

(1) Configuration of Storage System in First Embodiment

Foremost, the storage system according to the first embodiment is explained below.

Figure 1:
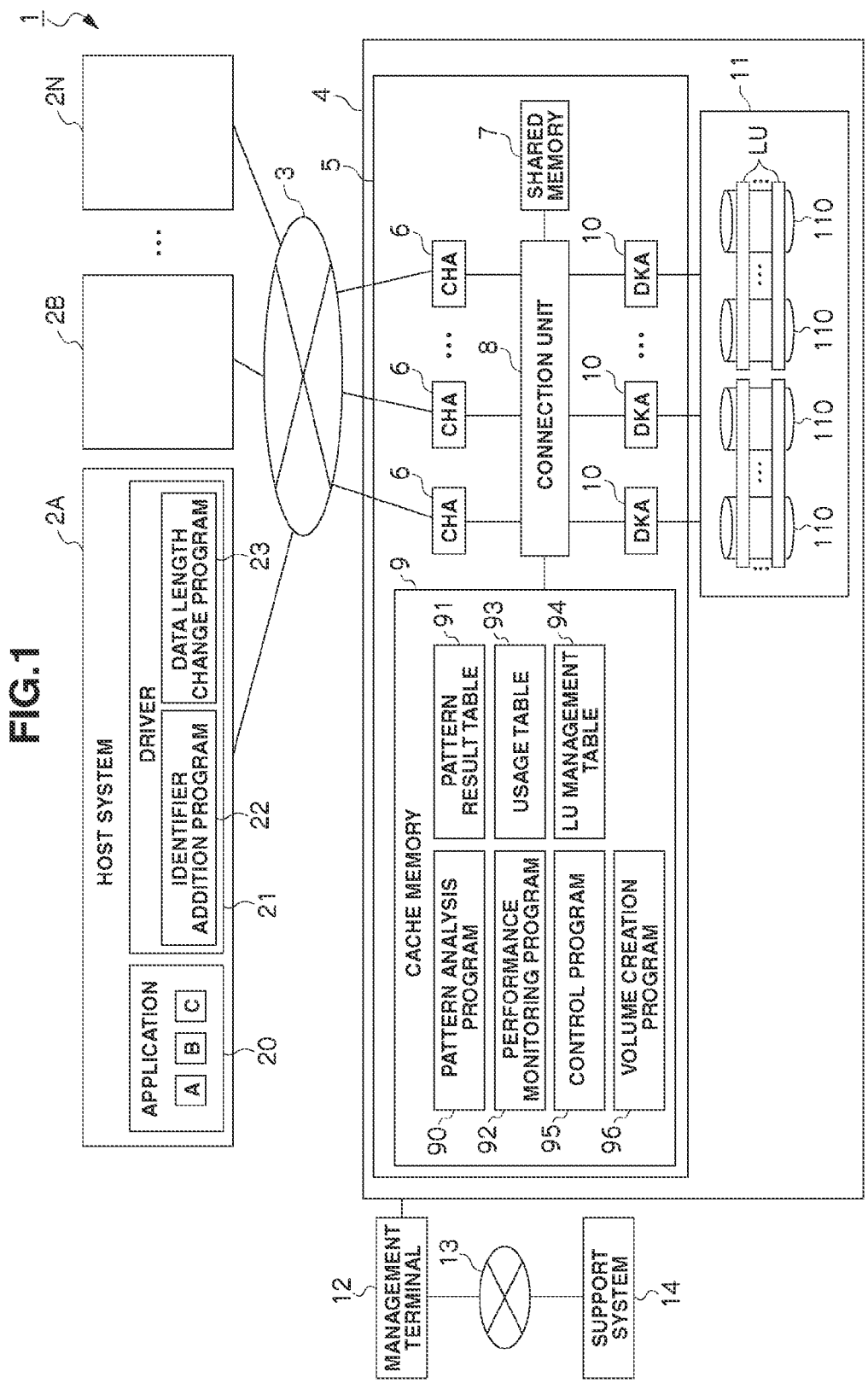
FIG. 1 is a block diagram showing the overall configuration of a storage system according to an embodiment of the present invention.

FIG. 1 shows an overall storage system 1 according to an embodiment of the present invention. The storage system 1 is configured by a host system 2 connected to a storage apparatus 4 via a network 3, the storage apparatus 4 being connected to a management terminal 12, and the management terminal 12 being connected to a support system 14 via a network 13.

The host system 2 is a computer device comprising information processing resources such as a CPU (Central Processing Unit) and a memory, and comprises an information input device (not shown) such as a keyboard, a switch, a pointing device, or a microphone and an information output device (not shown) such as a monitor display or a speaker. The host system 2 comprises an application 20 having various types of application software A to C, and a driver 21.

The driver 21 is software for achieving the present invention, and includes an identifier addition program 22 and a data length change program 23.

The identifier addition program 22 is a program for adding, upon sending data from a host system to the storage apparatus 4, an identifier to data for causing the storage apparatus 4 to identify such data.

The data length change program 23 is a program for changing the data transfer length of data sent from the storage apparatus 4.

Incidentally, the host system 2 contains an OS (Operating System) or a file system for managing files.

Networks 3, 13, for example, are configured from a SAN (Storage Area Network), a LAN (Local Area Network), Internet, a public line or a dedicated line. Communication between the host system 2 and the storage apparatus 4 via the network 3 is conducted, for instance, according to a fibre channel protocol when the network 3 is a SAN, and according to a TCP/IP (Transmission Control Protocol/Internet Protocol) protocol when the network 13 is a LAN.

The storage apparatus 4 is a storage controller comprising a controller for controlling the input and output of data to and from the host system 2, and a hard disk drive unit 11 for storing data from the host system 2.

The controller 5 is configured by a channel adapter 6, a shared memory 7, a cache memory 9, and a disk adapter 10 being connected via a connection unit 8. The transfer of data and commands among the channel adapter 6, the shared memory 7, the cache memory 9, and the disk adapter 10 is conducted by a switch such as an ultra-fast crossbar switch for performing data transfer with high-speed switching, or a bus.

The channel adapter 6 is configured as a microcomputer system comprising a microprocessor, a local memory, a communication interface (not shown) and the like, and comprises ports (not shown) for connection to the network 3. The channel adapters 6 interpret various commands sent from the host system 2 and execute necessary processing. The ports of the channel adapter 6 are allocated with a network address (for instance, an IP address or a WWN) for identifying the respective ports, and each channel adapter 6 is thereby able to individually function as a NAS (Network Attached Storage).

The shared memory 7 is a storage memory to be shared by the channel adapter 6 and the disk adapter 10. The shared memory 7 is primarily used for storing system configuration information and various control programs read from a system volume when the power of the storage apparatus 4 is turned on, and commands from the host system 2.

The cache memory 9 is also a storage memory to be shared by the channel adapter 6 and the disk adapter 10. The cache memory 9 is primarily used for temporarily storing user data to be input and output to and from the storage apparatus 4.

The cache memory 9 stores a pattern analysis program 90 for analyzing a plurality of different access patterns, a pattern result table 91 for registering results based on the pattern analysis program 90, a performance monitoring program 92 for monitoring the performance speed of the overall storage system 1, a usage table 93 for managing the usage of a logical volume, an LU management table 94 for managing the logical volume formed with the hard disk drive unit 11, a control program 95 for performing control processing based on the pattern analysis results, and a volume creation program 96 for creating a new logical volume with parameters after the control. The pattern result table 91, the usage table 93 and the LU management table 94 will be described later.

The disk adapter 10 is configured as a microcomputer system comprising a microprocessor, a memory and the like, and functions as an interface for performing protocol control during communication with the hard disk drive unit 11. The disk adapter 10, for instance, is connected to the hard disk drive unit 11 via a fibre channel cable, and sends and receives data to and from the hard disk drive unit 11 according to the fibre channel protocol.

The hard disk drive unit 11, for example, is configured from a plurality of hard disk drives 110 formed of expensive hard disk drives 110 such as SCSI (Small Computer System Interface) disks or inexpensive hard disk drives such as SATA (Serial AT Attachment) disks.

One or more logical volumes LU are defined in a storage area provided by the hard disk drives 110. Data from the host system 2 is read from and written into the logical volumes LU in block units of a prescribed size.

Each logical volume LU is allocated with a unique identifier (LUN: Logical Unit Number). In the case of this embodiment, the input and output of user data are performed by combining the identifier and a unique number (LBA: Logical Block Address) to be allocated to the respective blocks as an address, and designating this address.

The management terminal 12 is a computer device for a server to be operated for managing the storage apparatus 4, and, for instance, is configured from a laptop personal computer. The management terminal 12 is able to monitor the occurrence of a failure in the storage apparatus 4 and display such failure on a display screen (not shown).

The support system 14 is a computer system to be operated by monitored for the maintenance of the storage apparatus 4. In the support system 14, information concerning the storage apparatus 4 is sent from the management terminal 12 managing the storage apparatus 4.

(2) Tables (2-1) Pattern Result Table

The pattern result table 91 stored in the cache memory 9 is now explained.

The pattern result table 91 is a table for storing and managing the analysis result of a plurality of different access patterns sent from the host system 2. As shown in FIG. 2, the pattern result table 91 is configured from a "pattern number" field 91A, a "logical volume number" field 91B, a "host system number" field 91C, an "application" field 91D, a "usage" field 91E, a "performance threshold value" field 91F, a "type of I/O" field 91G, a "cycle" field 91H, a "boundary" field 91I and a "control method" field 91J.

The "pattern number" field 91A stores the number given to an analyzed pattern after the plurality of different access patterns sent from the host system 2 are analyzed.

The "logical volume number" field 91B stores the number of a logical volume LU storing data based on the analyzed access pattern.

The "host system number" field 91C stores the number of the host system 2 that sent the access pattern to the storage apparatus 4.

The "application" field 91D stores the type of application loaded in the host system as the source of access information.

The "usage" field 91E stores the usage of the logical volume LU. As the usage, there are a usage for databases and a usage for archives. The details will be described later.

The "performance threshold value" field 91F stores the threshold value of the performance of the corresponding logical volume LU. This threshold value is to be set by the user. When the user does not input any value, "0" is set.

The "type of I/O" field 91G stores the type of access pattern from the host system 2 to the logical volume LU.

The type of access pattern can be broadly classified as a random access or a sequential access. Random access refers to the I/O load where the continuously issued read or write request does not show the adjacent data. Random access refers to any and all so-called I/O loads that are not generally sequential regardless of whether or not the distribution of data arrangement is truly random. Random access is characteristic to intensive applications of an I/O request. There are two types of random access; namely, random write and random read.

Sequential access refers to the I/O load of the continuous read or write request of adjacent data. Sequential access is characteristic to applications that transfer large data. There are two types of sequential access; namely, sequential read and sequential write.

The "cycle" field 91H stores one cycle of the read/write request to be recognized by the storage apparatus 4.

The "boundary" field 91I stores the displacement value of the start location of data to be written in the logical volume LU.

The "control method" field 91J stores the control method to be performed by the storage apparatus based on the analyzed access pattern.

(2-2) Usage Table

Figure 3:
FIG. 3 is a chart showing a usage table according to an embodiment of the present invention.

Information stored in the "usage" field 91E is now explained with reference to the usage table 93 shown in FIG. 3.

As information to be stored in the "usage" field 91E, there is "table," "index," "journal" and "log" information to become information for databases, and "archive" information to become information for archives.

When storing "table" information and "index" information in the "usage" field 91E, such information is selected on the assumption that the random read access is an operation to be primarily performed to the logical volume LU in advance by the storage apparatus 4.

When storing "journal" information and "log" information in the "usage" field 91E, such information is selected on the assumption that the sequential write access is an operation to be primarily performed to the logical volume LU in advance by the storage apparatus 4. Incidentally, a journal is data for storing the update history of data to be stored in the logical volume LU.

When storing "archive" information in the "usage" field 91E, such information is selected on the assumption that the sequential read access is an operation to be primarily performed to the logical volume LU in advance by the storage apparatus 4.

(2-3) LU Management Table

Figure 4:
FIG. 4 is a chart showing an LU management table according to an embodiment of the present invention.

As shown in FIG. 4, the LU management table 94 is a table for managing the logical volumes LU formed in the storage apparatus 4. The LU management table 94 is configured from a "logical volume number" field 94A, an "alias" field 94B, a "host system number" field 94C, and a "capacity" field 94D.

The "logical volume number" field 94A stores the number given to the logical volume LU.

The "alias" field 94B stores the alias of the logical volume LU. For example, when the logical volume LU is "1," this shows that it is a logical volume for storing the store master data.

The "host system number" field 94C stores the number of the host system 2 that will access a certain logical volume LU.

The "capacity" field 94D stores capacity information currently used by the logical volume LU.

(3) Pattern Analysis Function and Control Function

This storage system 1 is characterized in that, by including an identifier in the access information from the host system 2 to the storage apparatus 4 and the storage apparatus 4 analyzing the access pattern based on the access information (pattern analysis function) and performing optimal control based on the analysis result (control function), the storage apparatus 4 is able to make access while being conscious of the access pattern.

Here, access information refers to the read/write request from the host system 2.

The method of realizing the characteristic points of the present invention is now explained.

Foremost, although there are a plurality of access patterns, the following explanation will be based on pattern analysis processing and control processing corresponding to all access patterns. Pattern analysis processing and control processing based on individual and specific access patterns will be described later.

(3-1) Pattern Analysis Processing

Foremost, pattern analysis processing where the storage apparatus 4 analyzes some type of access pattern based on the access information from the host system 2 is explained. Pattern analysis processing is executed by the channel adapter 6 of the storage apparatus 4 based on the pattern analysis program 90.

Figure 5:
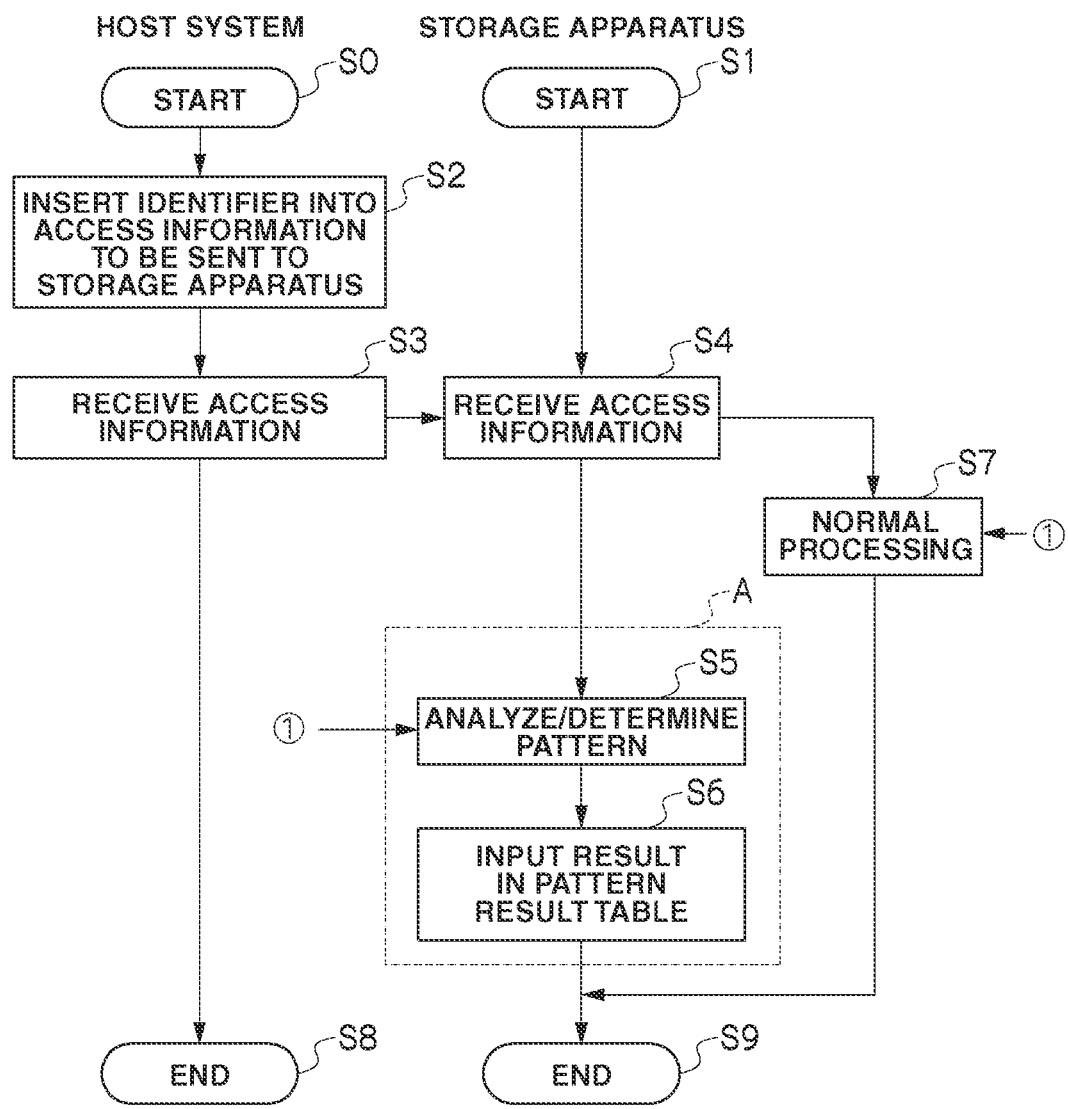
FIG. 5 is a flowchart showing pattern analysis processing according to an embodiment of the present invention.

As shown in FIG. 5, pattern analysis processing is started when the host system 2 sends data to the storage apparatus 4 (S0, S1).

The host system 2 inserts an identifier into the access information to be sent to the storage apparatus 4 (S2). For example, the host system 2 inserts an identifier using an empty bit of SCSI. Here, an identifier is a host computer identifier or an application identifier, and, for instance, the host system number or the type of application is inserted using an empty bit of SCSI into the access information to be sent. Incidentally, in this embodiment, although a host computer identifier and an application identifier are inserted as the identifier into the access information, only one between the host computer identifier and the application identifier can also be inserted.

When the host system 2 inserts the identifier into the access information to be sent, it sends data to the storage apparatus 4 (S3), and the processing is ended on the side of the host system 2 (S8).

When the storage apparatus 4 receives the access information from the host system 2 (S4), it determines the access information, and analyzes and determines the access pattern of the determined access information (S5).

Subsequently, the storage apparatus 4 inputs the identifier, and the analysis result of the access information and access pattern into the pattern result table 91 (S6). For example, the storage apparatus 4 receives a prescribed access pattern from the host system 2, and inputs the analyzed result as pattern "1." The other access patterns from the host system 2 that do not correspond to pattern "1" are input as pattern "2" and pattern "3."

When the storage apparatus 4 finishes its input into the pattern result table 91, the processing is ended on the side of the storage apparatus 4 (S9).

Further, at step S4, when the storage apparatus 4 receives the access information (S4), it performs normal data processing according to the access information from the host system 2 (S7). Processing is performed in parallel to steps S5 and S7.

For example, when the access information is a write request, the storage apparatus 4 temporarily stores the sent data, subsequent to the access information, in the cache memory 9, and performs destaging toward the logical volume LU designated by the access information.

When the access information is a read request, the storage apparatus 4 reads the data requested by the host system 2 from the logical volume LU storing such data, and sends it to the host system 2.

When the normal processing is complete, the storage apparatus 4 ends the pattern analysis processing (S9).

(3-2) Control Processing

Control processing to be performed by the storage apparatus 4 after the analysis result of each pattern is registered in the pattern result table 91 as a result of the storage apparatus 4 receiving access information containing the identifier from the host system 2 several times. Control processing is the process of performing control on the side of the storage apparatus 4 while being conscious of the applications loaded in the host system 2.

Control processing is primarily executed by the channel adapter 6 of the storage apparatus 4 based on the control program 95.

Figure 6:
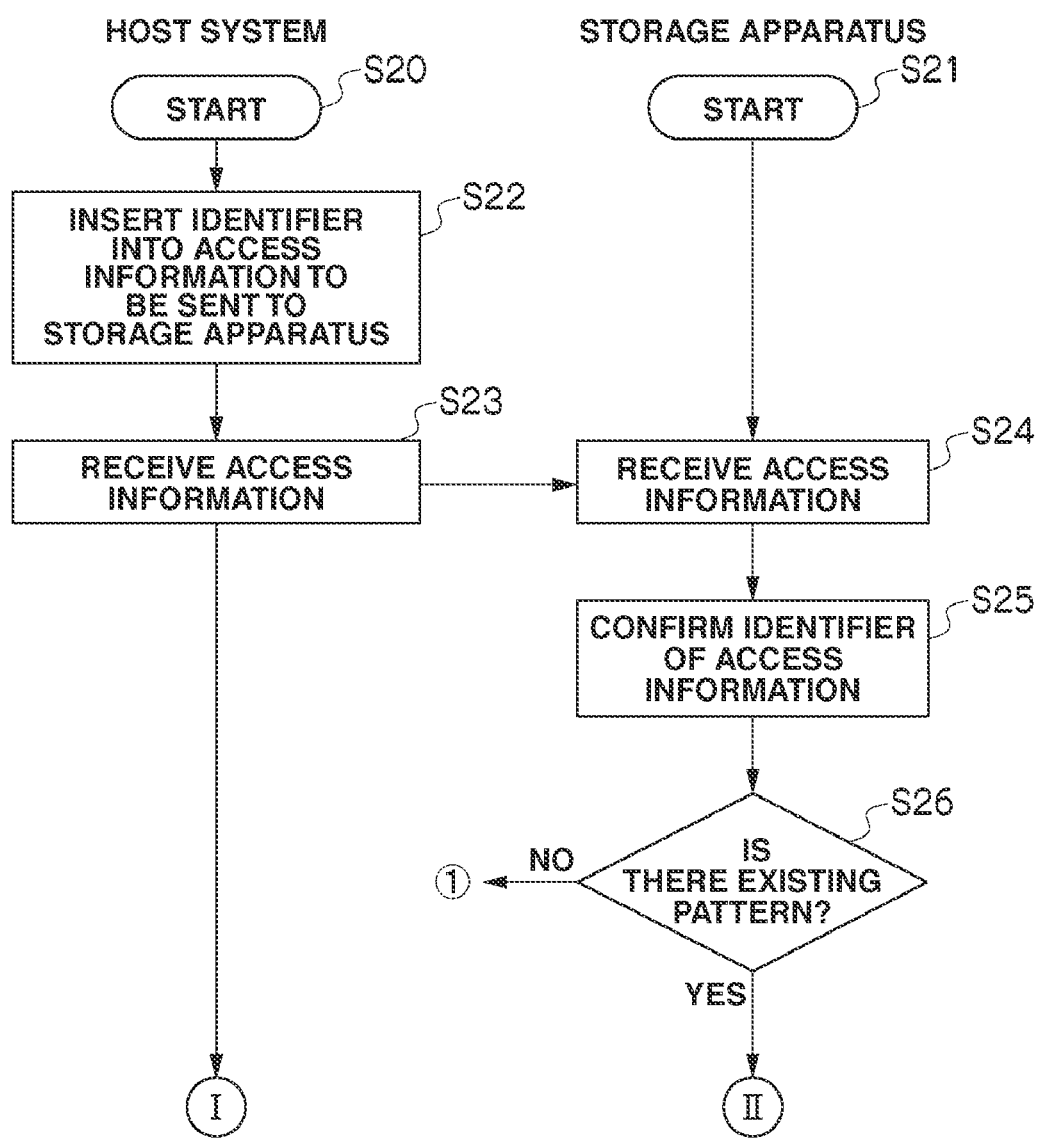
FIG. 6 is a flowchart showing control processing according to an embodiment of the present invention.
Figure 7:
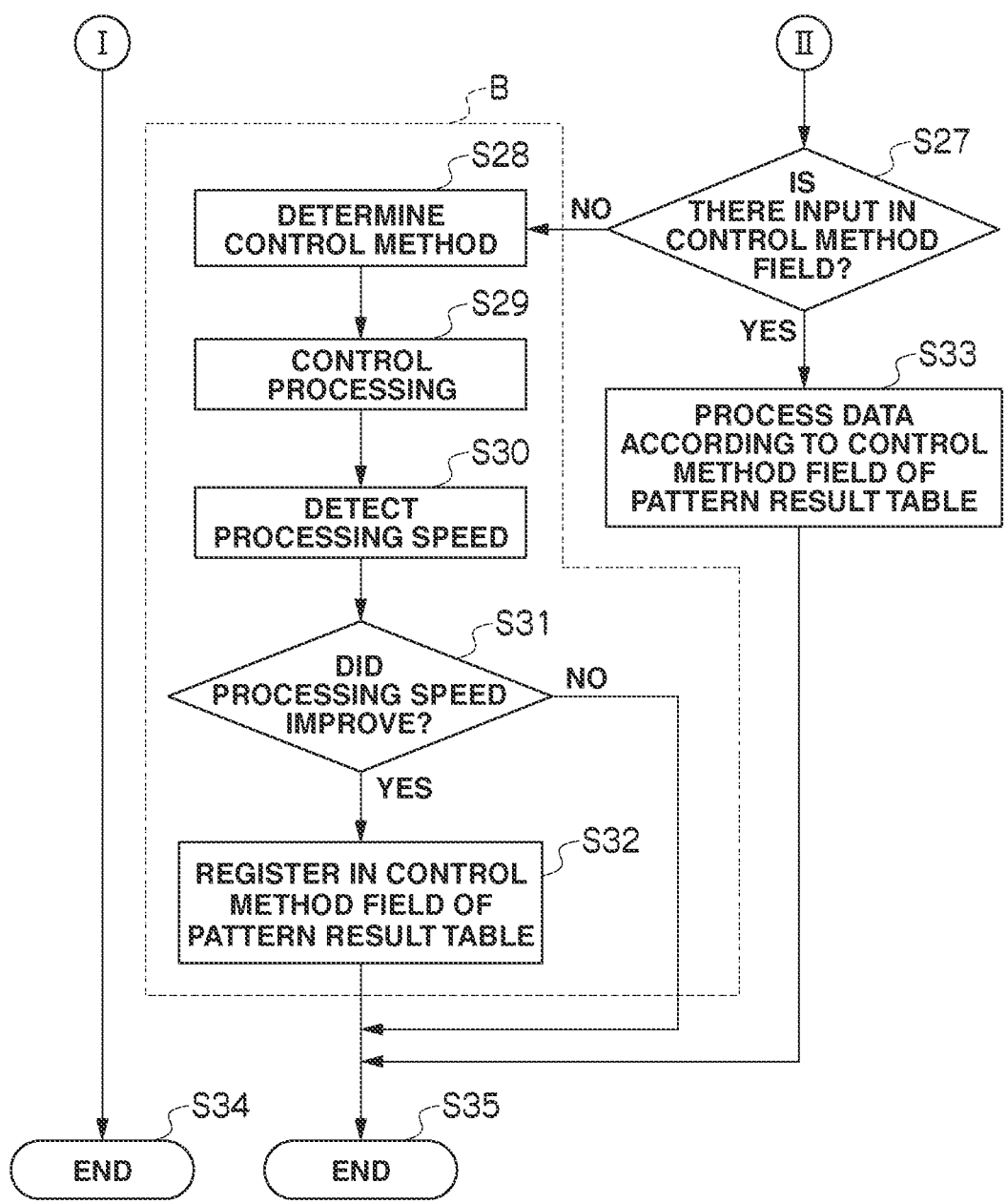
FIG. 7 is a flowchart showing control processing according to an embodiment of the present invention.

Foremost, as shown in FIG. 6 and FIG. 7, control processing is started when the host system 2 sends data to the storage apparatus 4 (S20, S21).

The host system 2 inserts an identifier into the access information to be sent to the storage apparatus 4 (S22). Similar to the pattern analysis processing, the host system 2 inserts an identifier into the access information using an empty bit of SCSI. Here, an identifier is a host computer identifier and an application identifier, and, for example, the host system number and the type of application are inserted.

When the host system 2 inserts an identifier into the access information to be sent, it sends the access information to the storage apparatus 4 (S23), and ends the processing (S34).

When the storage apparatus 4 receives the access information from the host system 2 (S24), it confirms the identifier contained in the received access information (S25).

The storage apparatus 4 refers to the pattern result table 91, and determines whether the identifier contained in the access information corresponds to the existing access pattern registered in the pattern table result table 91 (S26).

When the storage apparatus 4 determines that the access information from the host system 2 is an existing access pattern registered in the pattern table result table 91 (S26: YES), it determines whether the control method of the sent access information has been input in the "control method" field 91J of the pattern result table 91 (S27).

When the storage apparatus 4 determines that the control method of the sent access information has not been input in any way into the "control method" field 91J (S27: NO), the storage apparatus 4 determines the control method of the sent access information (S28), and performs control processing based on the determined control method (S29).

Subsequently, the storage apparatus 4 activates the performance monitoring program 92, detects the processing speed of the storage system 1 (S30), and determines whether the processing speed of the storage system 1 improved (S31).

When the storage apparatus 4 determines that the processing speed of the storage system 1 improved as a result of performing the control processing (S31: YES), it registers the control method determined at step S28 in the "control method" field 91J of the pattern result table 91 (S32), and ends this processing (S35).

At step S27, when the storage apparatus 4 determines that the control method of the send access information has been input into the "control method" field 91J registering the identifier of the sent data (S27: YES), it performs control processing according to the contents described in the "control method" field 91J (S33), and then ends this processing (S35).

At step S26, when the storage apparatus 4 determines that the access information from the host system 2 is not an existing access pattern registered in the pattern table result table 91 (S26: NO), it re-activates the pattern analysis program 90.

After activating the pattern analysis program 90, the storage apparatus 4 performs normal processing according to the access information received from the host system 2 (S7), and thereafter ends the processing (S9). Further, the storage apparatus 4 analyzes and determines the access information (S5), registers the analysis result in the pattern result table 91 (S6), and thereafter ends the processing (S9).

Incidentally, at step S31, when the storage apparatus 4 determines that the processing speed of the storage system 1 did not improve (S31: NO), it ends this processing (S35).

(3-3) Logical Volume Creation Processing

Upon performing pattern analysis processing or control processing, depending on the storage environment, performance of the storage system 1 may improve by creating a new logical volume LU with the controlled parameter. Here, processing of the storage apparatus 4 creating a new logical volume LU in the foregoing case is explained. Logical volume creation processing is primarily executed by the channel adapter 6 of the storage apparatus 4 based on the volume creation program 96.

Figure 8:
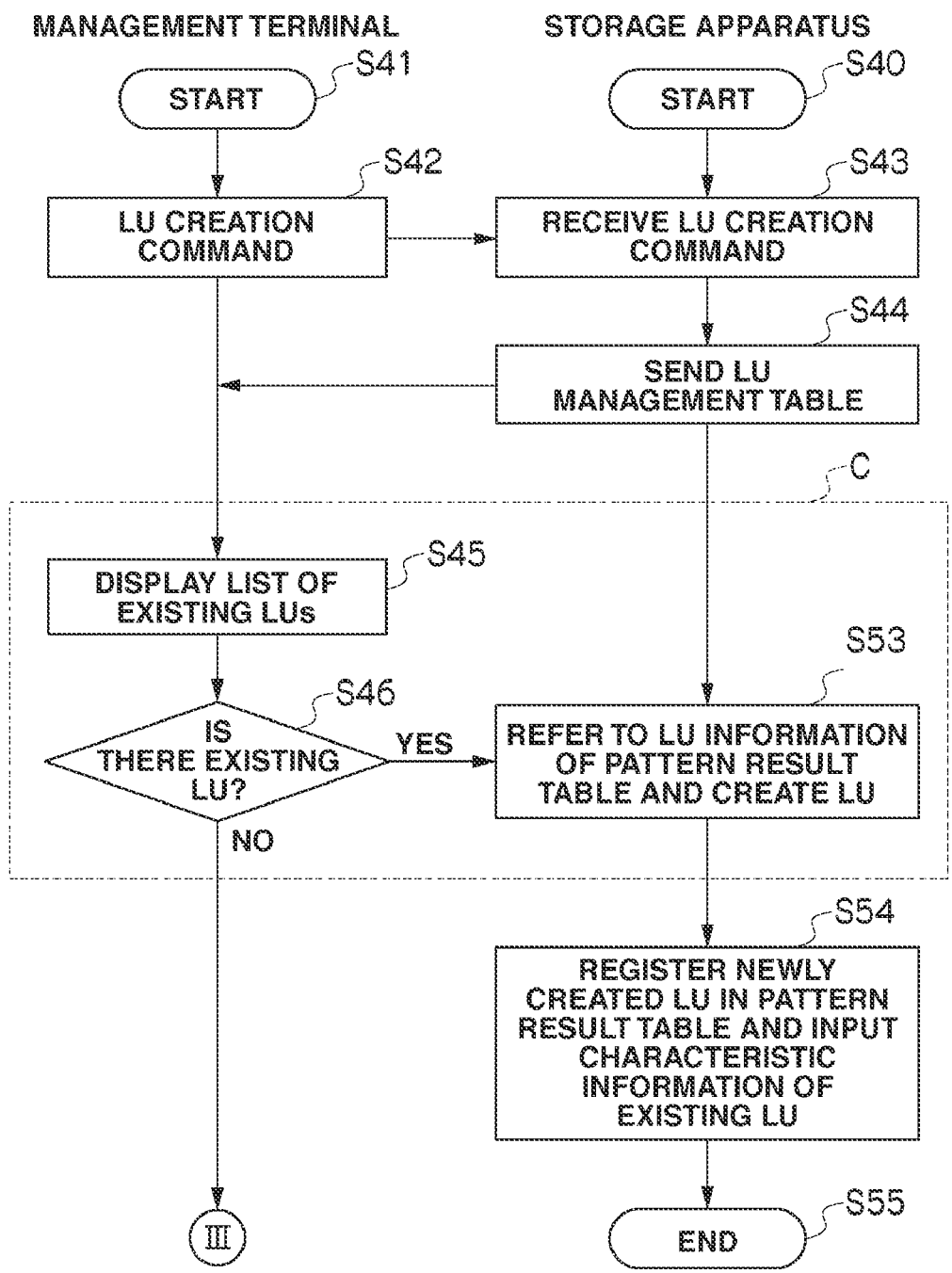
FIG. 8 is a flowchart showing creation processing of a new logical volume according to an embodiment of the present invention.
Figure 9:
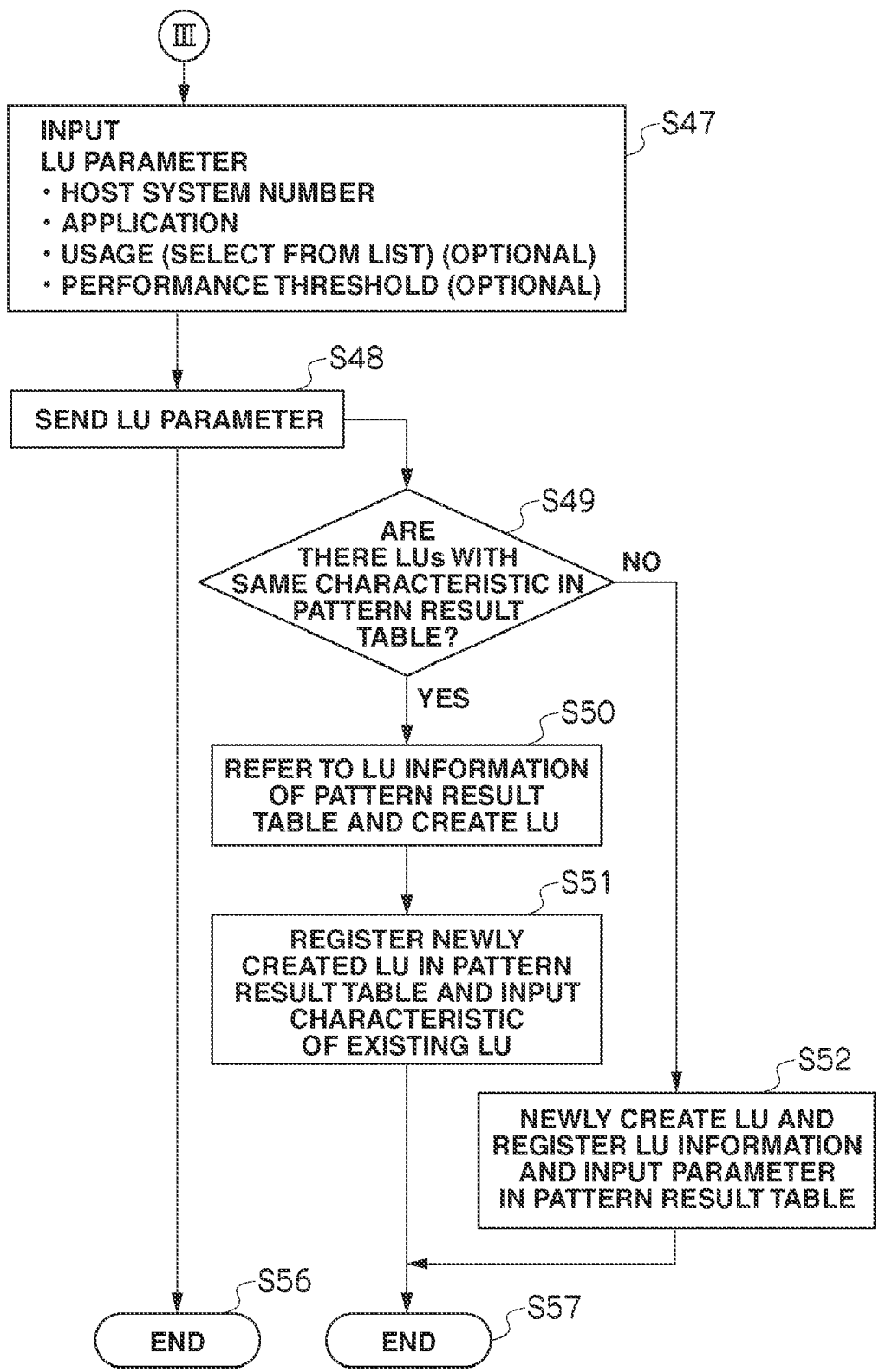
FIG. 9 is a flowchart showing creation processing of a new logical volume according to an embodiment of the present invention.

Foremost, as shown in FIG. 8 and FIG. 9, the storage apparatus 4 sends a message to the effect of creating a new logical volume LU to the management terminal 12, and the logical volume creation processing is started when the management terminal 12 receives the message (S40, S41).

Subsequently, the management terminal 12 sends a creation command to the storage apparatus 4 to create a logical volume LU (S42).

When the storage apparatus 4 receives the logical volume creation command (S43), it sends the LU management table 94 to the management terminal 12 (S44).

When the management terminal 12 receives the LU management table 94, it displays a list of the existing logical volumes LU on a screen of the management terminal 12 (S45).

The management terminal 12 determines whether an existing logical volume LU with the same parameter as the new logical volume LU to be created is in the LU management table 94 (S46).

When the management terminal 12 determines that an existing logical volume LU with the same parameter as the new logical volume LU to be created is not in the LU management table 94, or that there is an existing logical volume LU but is not to be selected (S46: NO), it inputs the parameter and creates the new logical volume LU (S47).

Here, a parameter, for example, is the number of the host system 2 or the type of applications A to C. The usage of the logical volume LU is arbitrarily selected from a list in the usage table 93 shown in FIG. 3. Further, as the parameter, the user may also arbitrarily input the performance threshold value.

When the management terminal 12 inputs the parameter, it sends this parameter to the storage apparatus 4 (S48), and ends the logical volume creation processing (S56).

Meanwhile, the storage apparatus 4 that received the parameter determines whether a logical volume LU with the same characteristics as this parameter exists in the pattern result table 91 (S49).

When the storage apparatus 4 determines that a logical volume LU with the same characteristics as this parameter exists in the pattern result table 91 (S49: YES), it refers to the corresponding logical volume LU information of the pattern result table 91, and creates a logical volume LU based on the logical volume information (S50).

When the storage apparatus 4 registers the number of the created new logical volume LU and the referred logical volume information in the pattern result table 91 (S51), it ends this logical volume creation processing (S57).

Meanwhile, at step S49, when the storage apparatus 4 determines that a logical volume LU with the same characteristics as this parameter does not exist in the pattern result table 91 (S49: NO), it creates a logical volume LU, registers the number and parameter of the created new logical volume LU in the pattern result table 91 (S52), and ends this logical volume creation processing (S57).

At step S46, when the management terminal 12 determines that an existing logical volume LU with the same parameter as the new logical volume LU to be created is in the LU management table 94 (S46: YES), it performs the processing at steps S53 to S55 as with the processing at steps S50, S51 and S57 according to the same processing routine.

(3-4) Processing Based on Specific Access Pattern

Pattern analysis processing and control processing to be specifically performed by the storage apparatus 4 based on specific access patterns are now explained.

(3-4-1) Mixed Access Pattern of Write-Read-Write

Foremost, as access pattern 1, a case is explained where the storage apparatus 4 receives a read/write request from the host system 2 in which write-read-write is one cycle.

The storage environment before performing control in this embodiment was as follows.

In other words, when the storage apparatus 4 receives the initial write access request, data from the host system 2 is foremost written in the cache memory 9. Here, the write time was approximately 0.1 (ms).

Subsequently, data temporarily written in the cache memory 9 is destaged to the hard disk drive 110. Destaging is performed each time data is written in the cache memory 9. While destaging is performed, the cache memory 9 is locked so that the other areas in the cache memory 9 cannot be accessed. Here, the destaging time was approximately 10 (ms).

Subsequently, when the storage apparatus 4 receives the read access request, data written in the hard disk drive 110 is read after the cache memory 9 is unlocked. Here, the read time was approximately 0.1 (ms).

The cache memory 9 thereafter receives a write access request for overwriting the data. The overwrite data from the host system 2 is written in the cache memory 9. Here, the write time was approximately 0.1 (ms).

Thereby, under the storage environment before performing control, when the storage apparatus 4 receives a read/write request in which write-read-write is one cycle, it took approximately 10.3 (ms) to perform all processing.

Thus, the foregoing pattern analysis processing and control processing are specifically applied to establish the post-control storage environment.

Figure 10:
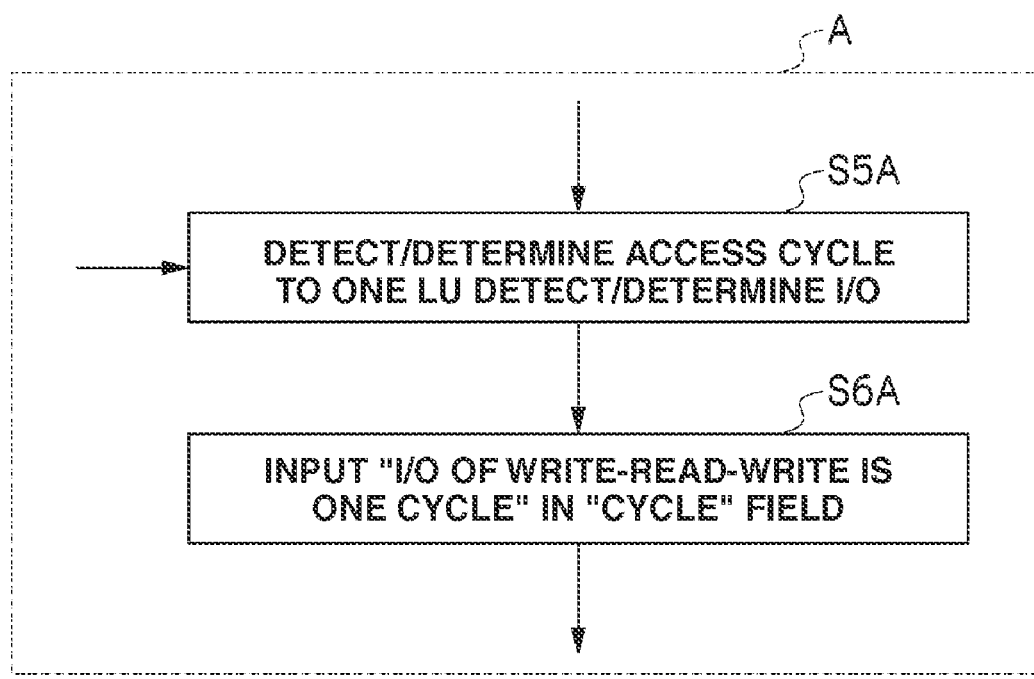
FIG. 10 is a flowchart showing a part of the pattern analysis processing according to an embodiment of the present invention.

FIG. 10 is a flowchart showing a part of the pattern analysis processing.

Foremost, the host system 2 and the storage apparatus 4 execute steps S0 to S4 explained with reference to FIG. 5.

Subsequently, since the data sent from the host system 2 contains an identifier, the storage apparatus 4 detects and determines the access cycle to a single logical volume (S5A). Specifically, the storage apparatus 4 determines that the access cycle to the logical volume LU is one cycle of write-read-write.

When the analysis and determination of the pattern are complete, the storage apparatus 4 inputs "write-read-write is one cycle" in the "cycle" field 91H of the pattern result table 91 (S6A). The storage apparatus 4 thereafter ends the pattern analysis processing (S9).

Figure 11:
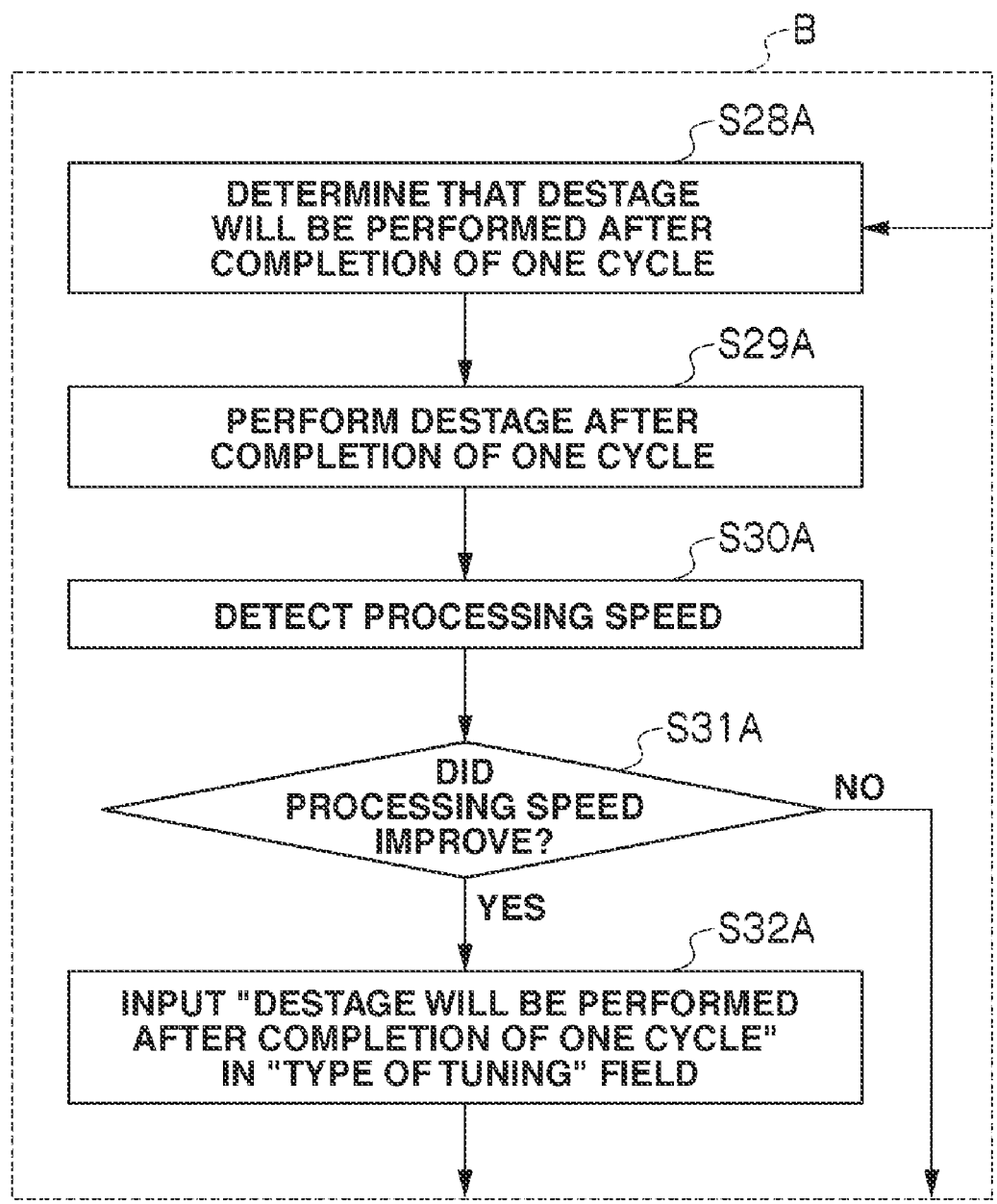
FIG. 11 is a flowchart showing a part of the control processing according to an embodiment of the present invention.

FIG. 11 is a flowchart showing a part of the control processing.

The host system 2 and the storage apparatus 4 execute steps S20 to S27 explained with reference to FIG. 6 and FIG. 7.

When the storage apparatus 4 determines that the control method has not yet been input in the "control" field 91J of the pattern result table 91 (S27: NO), it sets "write-read-write" as one cycle, processes one-cycle worth of read/write request, and thereafter destages the data temporarily stored in the cache memory 9 to the hard disk drive 110 so as to determine the control method (S28A).

The storage apparatus 4, based on this determination result, processes one-cycle worth of read/write request and thereafter performs destaging to the hard disk drive 110 (S29A).

Subsequently, the storage apparatus 4 activates the performance monitoring program 92 and detects the processing speed of the storage system 1 (S30A), and determines whether the processing speed of the storage system 1 improved (S31A).

When the storage apparatus 4 determines that the processing speed of the storage system 1 improved (S31: YES), it registers the control method of "perform destaging after completion of one cycle" in the "control" field 91J of the pattern result table 91 (S32A), and then ends this processing (S35).

Figure 12:
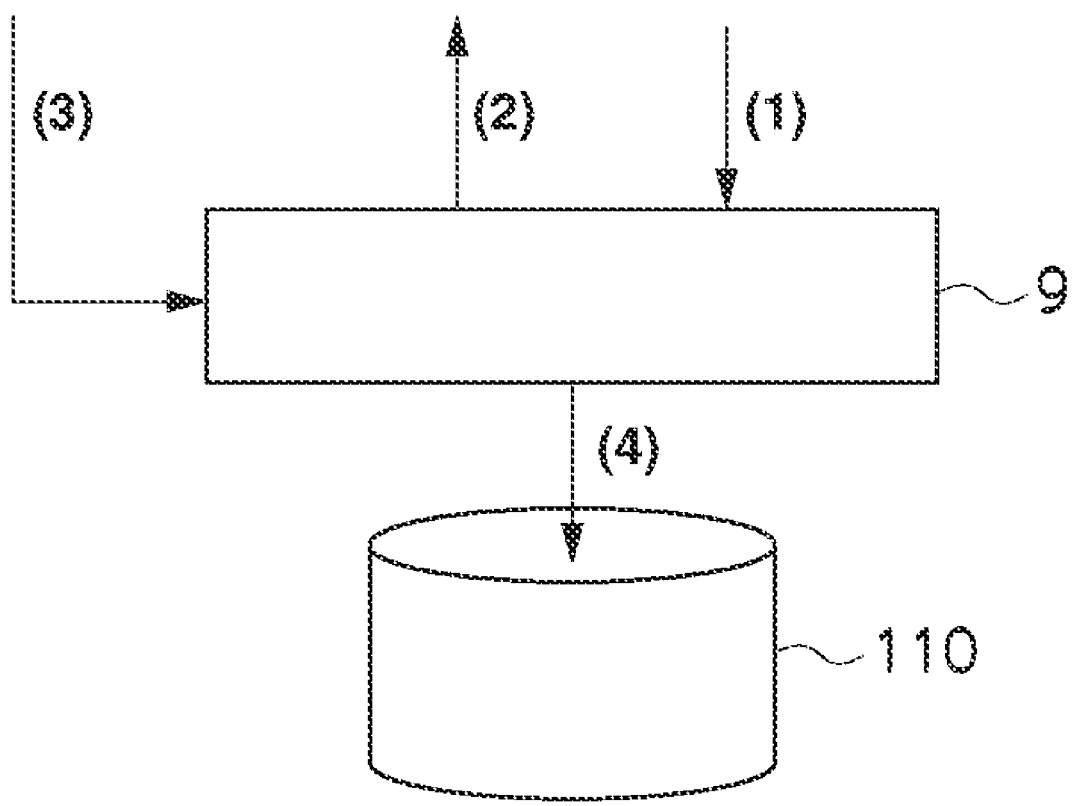
FIG. 12 is a conceptual diagram showing the order of destaging according to an embodiment of the present invention.

Thereby, the order of destaging data from the cache memory 9 to the hard disk drive 110 upon receiving the read/write request from the host system 2 will be the order shown in FIG. 12.

As a result of the storage apparatus 4 analyzing the mixed access pattern of write-read-write, it is able to recognize the read/write request of write-read-write as one cycle. Thus, it is possible to omit the destaging time of data performed during the read/write request that was required by the storage apparatus 4 before performing control.

Further, under a consolidation environment, since the environment is such that one storage apparatus 4 connects a plurality of host systems 2 or a plurality of types of applications, there are cases where various types of access coexist. In such a case, the storage apparatus 4 is able to distinguish the read/write request within one cycle by confirming the identifier inserted into the access information.

As a further specific example, even in a case when one host system 2 or application is using one logical volume LU, or in a case when a plurality of host systems 2 or applications are using one logical volume LU, it will suffice so as long as the applications coordinate and form an access pattern to one logical volume LU.

(3-4-2) Boundary Adjustment in Access Pattern

Subsequently, as access pattern 2, a case is explained where the storage apparatus 4 receives a read/write request, which is sequential read or write or random read or write, from the host system 2 is explained. Here, for the sake of convenience, an example where the storage apparatus 4 receives a read/write request that is sequential write is explained.

Figure 13:
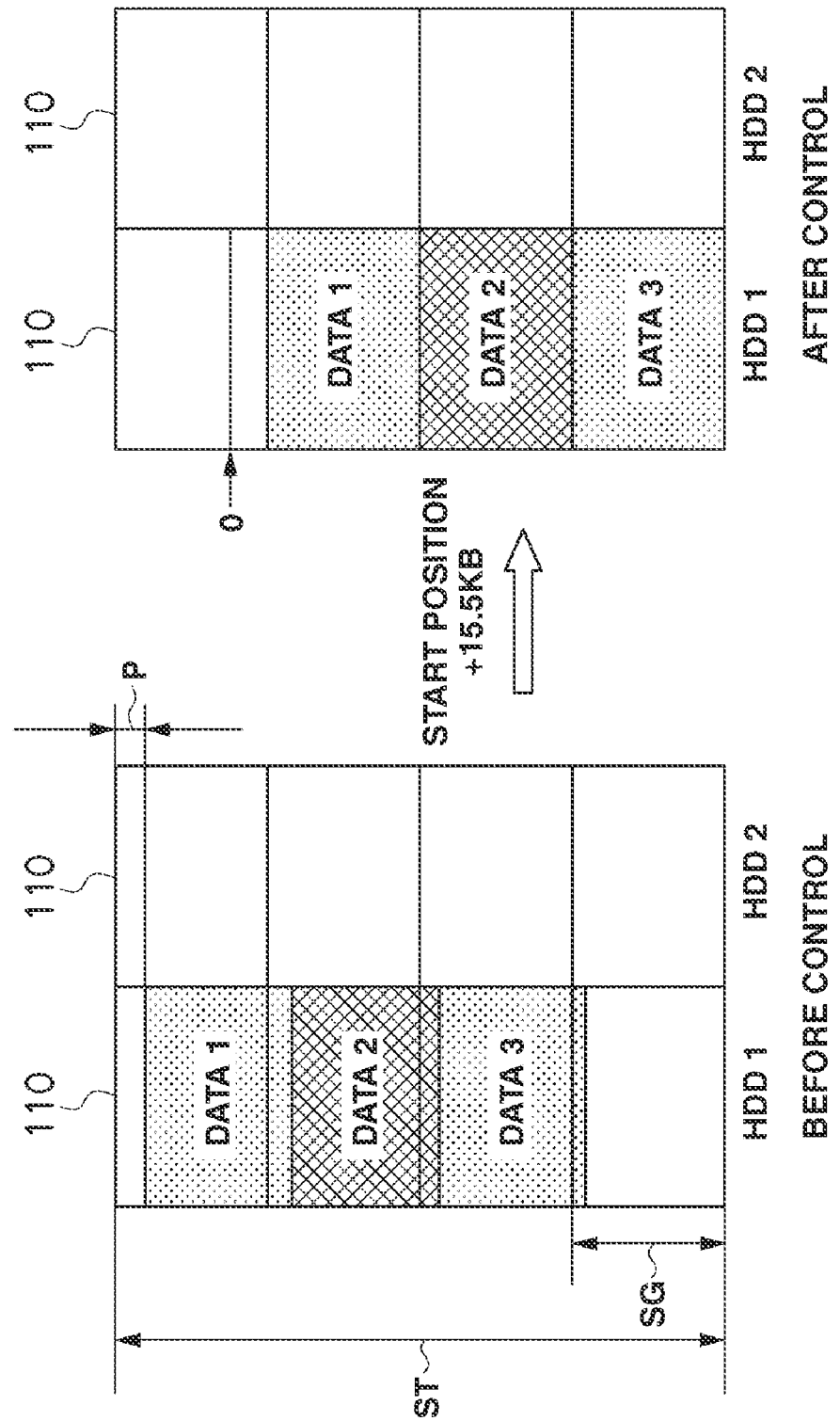
FIG. 13 is a conceptual diagram explaining boundary adjustment according to an embodiment of the present invention.

Although this embodiment can be applied regardless of the RAID level, here, as shown in FIG. 13, a case is explained where two hard disk drives 110 (indicated as HDD 1 and HDD 2 in FIG. 13) are configured as RAID 0 striping.

Specifically, the hard disk drive 110 of a striping configuration explained here is a case where the storage area (stripe ST) of storing a single data transfer length to be written from the cache memory 9 to the hard disk drive 110 is 64 KB, and the data transfer length (segment SG) from the host system 2 is 16 KB. During the writing into the hard disk drive 110, the four segments in the cache memory 9 are collectively written.

The storage environment before performing control was as follows.

Since the host system 2 uses the first several KB of data in order process data in a specific OS or application, the write start location in the cache memory 9 will be written upon being displaced several KB. This displacement is referred to as a boundary P.

For example, if the boundary P is 0.5 KB, since the single data transfer length written in the cache memory 9 is 16 KB, the write start location will start from 0.5 KB and the write end location will become 16.5 KB.

Here, since two segments are locked, it is necessary to wait for the writing in the hard disk drive 110 according to the subsequent read/write request.

Due to this standby time, the efficiency of the hard disk drive 110 will deteriorate. Similarly, even when the segments of the cache memory 9 are collectively written in the hard disk drive 110, a boundary P will similarly arise, and, although writing should only be made essentially in the hard disk drive HDD 1, writing will be made in both the hard disk drives HDD 1, HDD 2.

Thus, by specifically applying the foregoing pattern analysis processing and control processing, the post-control storage environment is established.

Foremost, under the test environment of the storage system 1, the host system 2 and the storage apparatus 4 execute the pattern analysis processing. Here, under the test environment, a case is explained where a read/write request to a certain logical volume LU is received.

Figure 14:
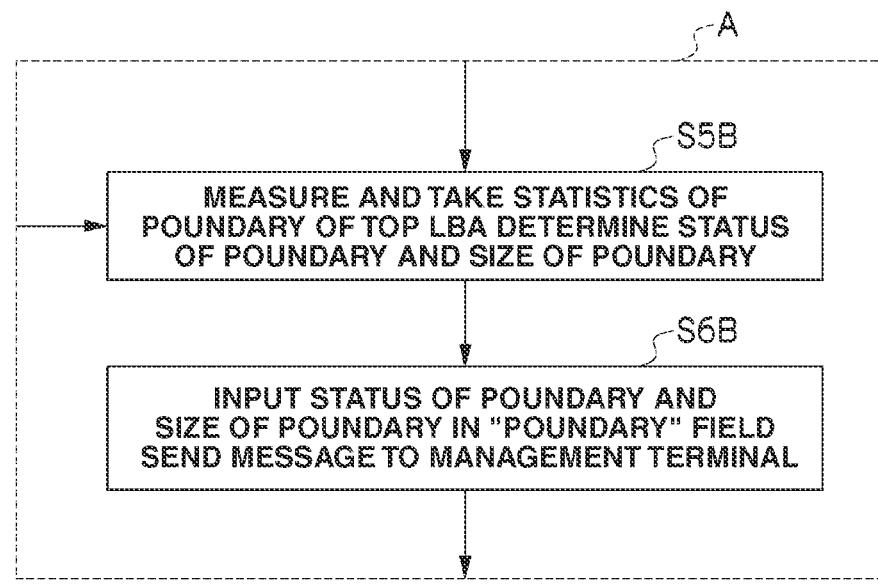
FIG. 14 is a flowchart showing a part of the pattern analysis processing according to an embodiment of the present invention.

FIG. 14 is a flowchart showing a part of the pattern analysis processing.

Foremost, the host system 2 and the storage apparatus 4 execute steps S0 to S4 explained with reference to FIG. 5.

Since an identifier is contained in all access information sent from the host system 2, the storage apparatus 4 measures the boundary P of the start LBA and takes statistics of the boundary P (S5B). The storage apparatus 4 thereafter analyzes and determines the status of the boundary P and the size of the boundary P (S5B). Specifically, the storage apparatus 4, for example, determines that there is a boundary P, and that the boundary P is 0.5 KB.

When the analysis and determination of the pattern is complete, the storage apparatus 4 inputs "there is boundary, and that boundary is 0.5 KB" in the "boundary" field 91I of the pattern result table 91 (S6B).

In a specific example of this embodiment, since there is a boundary P, the storage apparatus 4 sends a message to the effect of "optimization of performance by using another logical volume LU is recommended" to the management terminal 12 (S6B).

Incidentally, when there is no boundary P, the storage apparatus 4 inputs that the boundary P is "0" in the pattern result table 91.

The storage apparatus 4 thereafter ends this pattern analysis processing (S9).

Figure 15:
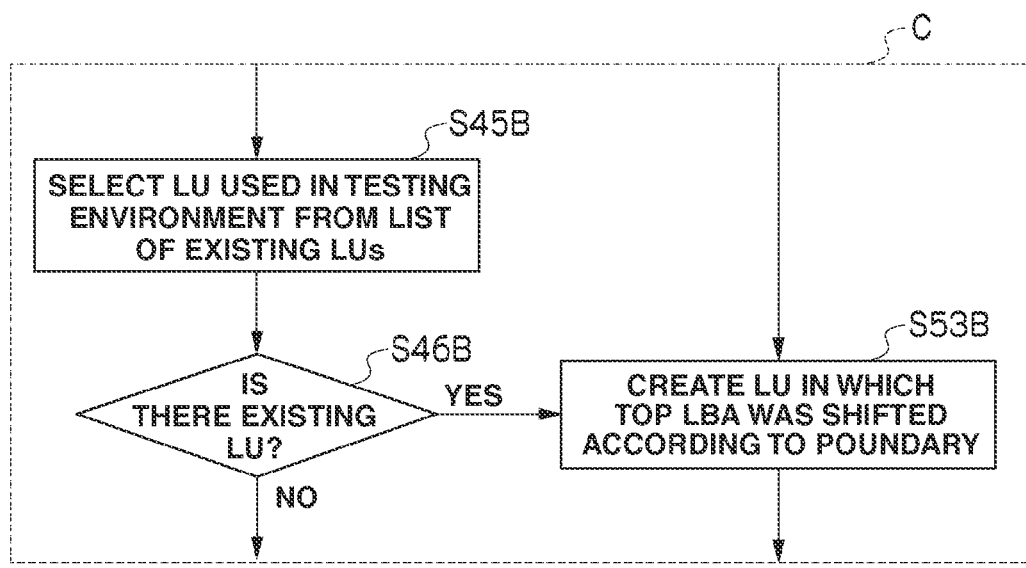
FIG. 15 is a flowchart showing a part of the creation processing of a new logical volume according to an embodiment of the present invention.

FIG. 15 is a flowchart showing a part of the logical volume creation processing.

At step S6B, when the storage apparatus 4 sends a message to the management terminal 12, the storage apparatus 4 and the management terminal 12 execute processing from step S40 to step S44.

When the management terminal 12 receives an LU management table 94 from the storage apparatus 4, it displays a list of the existing logical volumes LU on a screen of the management terminal 12 (S45B).

In addition, the management terminal 12 selects the logical volume LU used under the test environment from the list of the existing logical volumes LU (S45B).

The management terminal 12 determines whether an existing logical volume LU with the same parameter as the new logical volume LU to be created exists in the LU management table 94 (S46B).

Since the management terminal 12 selected the existing logical volume used under the test environment at step S45B, it determines that there is an existing logical volume (S46B: YES).

The storage apparatus 4 refers to the "boundary" field 91I of the pattern result table 91, and creates a logical volume LU in which the start LBA is matched to the boundary (S53B). According to the specific example of this embodiment, since it is determined that the boundary at step S6B is 0.5 KB, a logical volume LU in which the start LBA is displaced 0.5 KB is created. In other words, the start LBA, as shown in FIG. 13, will become 15.5 KB or −0.5 KB.

Subsequently, as explained in FIG. 8, the storage apparatus 4 registers the number of the created new logical volume LU in the pattern result table 91 (S54). In addition, the storage apparatus 4 registers the address as the logical volume information, from which boundary P was deducted, as the boundary value in the pattern result table 91 (S54), and then ends this logical volume creation processing (S55).

A specific example of this embodiment can also be realized by using AOU (Allocation on Use) volume of providing a virtual logical volume to the host system 2 without creating a logical volume LU of a fixed capacity from the hard disk drive 110, and dynamically allocating the storage area of the hard disk drive 110 to the virtual logical volume according to the request from the host system 2.

Further, when there is a read/write request from the host system 2 to the AOU volume, the storage apparatus 4 can delete the target AOU volume according to the request from the host system 2.

Specifically, the host system 2 has applications A to C for executing business operations, and an OS or a file system for managing the storage area of the AOU volume to be used by the applications A to C.

The OS or the file system has a file stored in the storage area of the AOU volume, and a management table for managing the address storing the file.

When the OS or the file system receives a file read request from the applications A to C, it sends the address storing the file that received the read request from the management table to the storage apparatus 4 together with the read request.

Similarly, when the OS or the file system receives a file write request from the applications A to C, it sends the address of an empty area from the management table and the data and write request of the file to the storage apparatus 4.

When a physical storage area is not allocated to the corresponding address, the controller 5 of the storage apparatus 4 that received the read/write request allocates a physical storage area, and stores the data from the host system 2 in the allocated physical area.

Further, when the OS or the file system receives a deletion (delete) request from the applications A to C, it deletes the file to be deleted from the management table. Further, the OS or the file system sends the address of the deleted file to the storage apparatus 4 together with the deletion request.

When the controller 5 of the storage apparatus 4 receives the deletion request, it releases the physical storage area corresponding to this address.

Thereby, since the storage apparatus 4 will be able to analyze the access pattern and detect the boundary, and create a new logical volume LU while giving consideration to the boundary in advance, it is possible to avoid the deterioration in the efficiency of the hard disk drive 110.

Further, by setting the deletion request to be access information, a system configuration is realized where the OS or the file system is able to send the deletion request, and receive the deletion request on the side of the storage apparatus.

(3-4-3) Sequential Access

Subsequently, as access pattern 2, a case where the storage apparatus 4 receives a read/write request that is sequential read or write is explained.

(3-4-3-1) Sequential Write

Here, a case where the storage apparatus 4 receives a sequential write request is taken as an example and explained.

Foremost, the storage environment before performing control was as follows.

If the storage apparatus 4 simultaneously receives access information, which is a sequential write request, from the host system 2A and the host system 2B, since the reception of both host systems 2 will be recognized simultaneously, it appeared to be the reception of a random write request.

Thus, by specifically applying the pattern analysis processing and the control processing, the post-control storage environment will be established.

Figure 16:
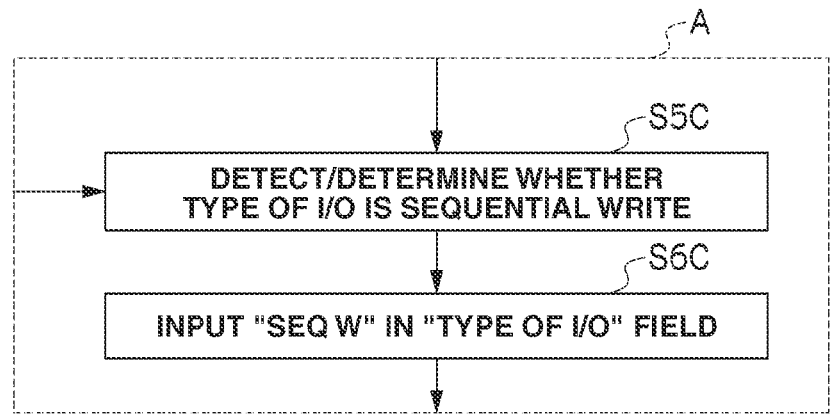
FIG. 16 is a flowchart showing a part of the pattern analysis processing upon receiving a sequence write request according to an embodiment of the present invention.

FIG. 16 is a flowchart showing a part of the pattern analysis processing.

Foremost, the host system 2 and the storage apparatus 4 execute steps S0 to S4 explained with reference to FIG. 5.

Since an identifier is contained in all access information sent from the host system 2, the storage apparatus 4 detects and determines the type of read/write request (S5C). Specifically, the storage apparatus 4 determines that the type of I/O is sequential write from the identifier.

When the analysis and determination of the pattern are complete, the storage apparatus 4 inputs that the pattern is "sequential write" in the "type of I/O" field 91H of the pattern result table 91 (S6C). The storage apparatus 4 thereafter ends the pattern analysis processing (S9).

Figure 17:
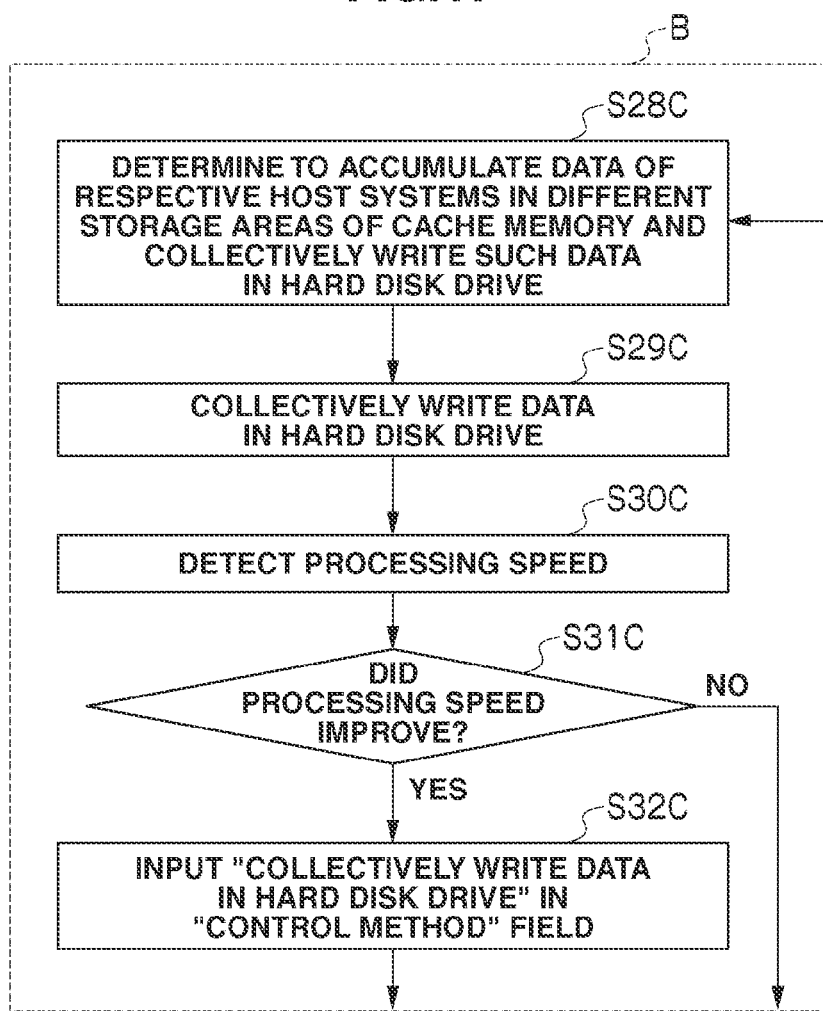
FIG. 17 is a flowchart showing a part of the control processing upon receiving a sequence write request according to an embodiment of the present invention.

FIG. 17 is a flowchart showing a part of the control processing.

The host system 2 and the storage apparatus 4 execute steps S20 to S27.

When the storage apparatus 4 determines that nothing has been input into the "control" field 91J of the pattern result table 91 (S27: NO), it determines the control method in a case of receiving "sequential write" (S28C).

Specifically, the storage apparatus 4 determines a control method of accumulating data received from the respective host systems 2 in different storage areas in the cache memory 9, and collectively writing the same in the hard disk drive 110.

The storage apparatus 4, based on this determination result, collectively writes the accumulated data in the hard disk drive 110 (S29C).

The storage apparatus 4 thereafter activates the performance monitoring program 92, detects the processing speed of the storage system 1 (S30C), and determines whether the processing speed of the storage system 1 improved (S31C).

When the storage apparatus 4 determines that the processing speed of the storage system 1 improved (S31C: YES), it registers the control method of "collective writing in hard disk drive 110" in the "control" field 91J of the pattern result table 91 (S32C), and then ends this processing (S35).

(3-4-3-2) Sequential Read

Subsequently, a case where the storage apparatus 4 receives access information, which is a sequential read request, is taken as an example and explained.

Similar to the case of receiving a sequential write request, in the storage environment before performing control, if the storage apparatus 4 simultaneously receives a sequential read request from the host system 2A and the host system 2B, since the reception of both host systems 2 will be recognized simultaneously, it appeared to be the reception of a random write request.

Figure 18:
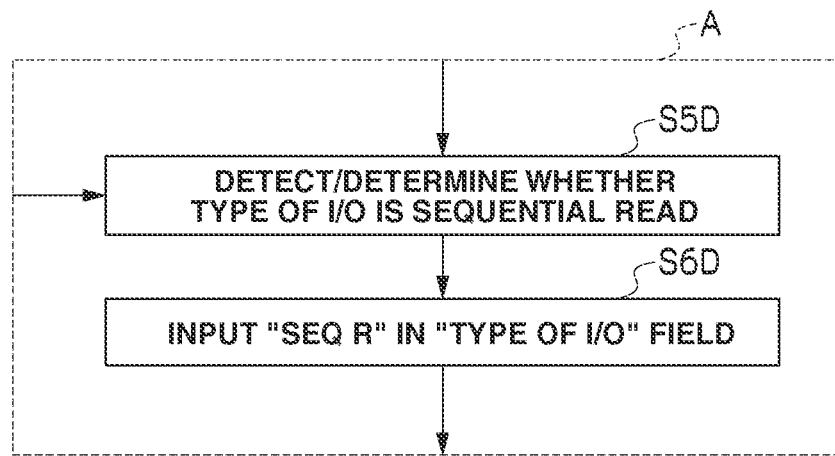
FIG. 18 is a flowchart showing a part of the pattern analysis processing upon receiving a sequence read request according to an embodiment of the present invention.

FIG. 18 is a flowchart showing a part of the pattern analysis processing.

Foremost, the host system 2 and the storage apparatus 4 execute steps S0 to S4 explained with reference to FIG. 5.

Since an identifier is contained in all access information sent from the host system 2, the storage apparatus 4 detects and determines the type of read/write request (S5D). Specifically, the storage apparatus 4 determines that the type of I/O is access information of a sequential read request from the identifier.

When the analysis and determination of the pattern are complete, the storage apparatus 4 inputs that the pattern is "sequential read" in the "type of I/O" field 91H of the pattern result table 91 (S6D). The storage apparatus 4 thereafter ends the pattern analysis processing (S9).

Figure 19:
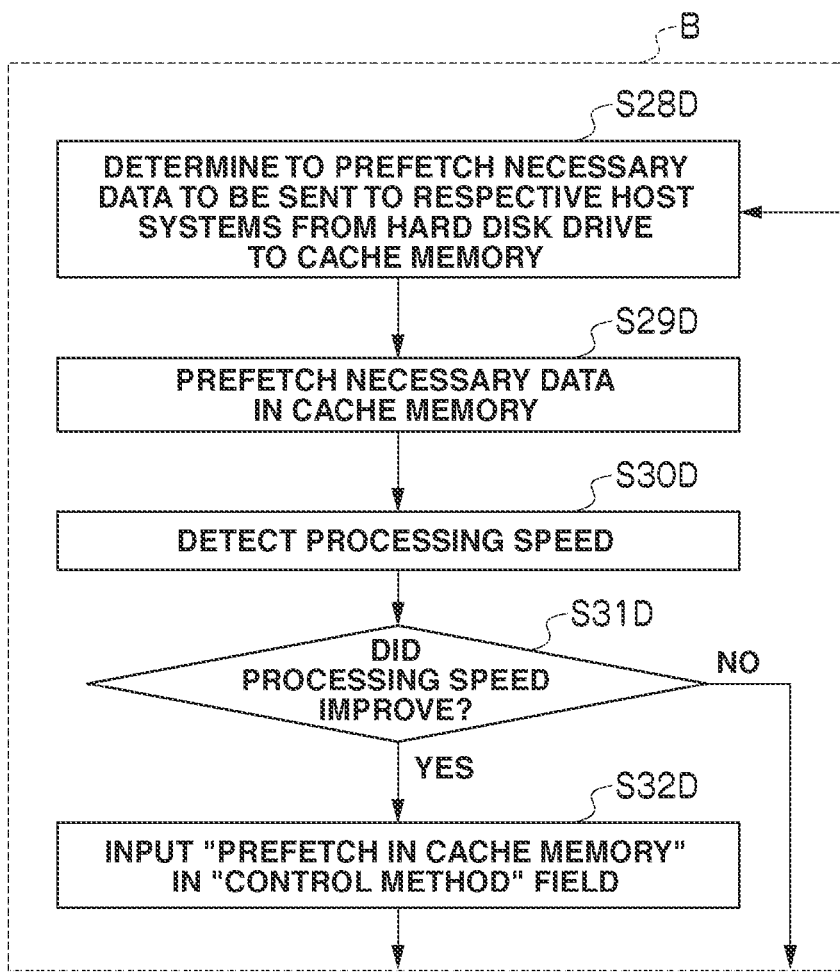
FIG. 19 is a flowchart showing a part of the control processing according to an embodiment of the present invention.

FIG. 19 is a flowchart showing a part of the control processing.

The host system 2 and the storage apparatus 4 execute steps S20 to S27.

When the storage apparatus 4 determines that nothing has been input into the "control" field 91J of the pattern result table 91 (S27: NO), it determines the control method in a case of receiving "sequential read" (S28D).

Specifically, the storage apparatus 4 determines a control method of prefetching necessary data to be sent to the respective host systems 2 from the hard disk drive 110 to the cache memory 9.

The storage apparatus 4, based on the foregoing determination result, prefetches the necessary data from the hard disk drive 110 and stores it in the cache memory 9 (S29D).

The storage apparatus 4 thereafter activates the performance monitoring program 92, detects the processing speed of the storage system 1 (S30D), and determines whether the processing speed of the storage system 1 improved (S31D).

When the storage apparatus 4 determines that the processing speed of the storage system 1 improved (S31D: YES), it registers the control method of "prefetching in cache memory 9" in the "control" field 91J of the pattern result table 91 (S32D), and then ends this processing (S35).

As described above, due to the identifier inserted into the access information, the storage apparatus 4 is able to analyze and control the access pattern to create a storage environment that matches the environment on the host system side to which the inserted identifier is to be sent host system.

FIG. 20 shows the matters that can be controlled by the storage apparatus 4 depending on the type of read/write request.

When the type of read/write request is sequential read, as described above, a control method is executed where the storage apparatus 4 predicts data to be prefetched from the hard disk drive 110 to the cache memory 9, and thereby optimizes the process. In addition, during the pattern analysis processing, a control method is executed where the storage apparatus 4 optimizes the prefetch amount during the control by comprehending the volume of data to be prefetched.

When the type of read/write request is sequential write, as described above, a control method is executed where the storage apparatus 4 predicts necessary data to be collectively written from the cache memory 9 to the hard disk drive 110, and thereby optimizes the process.

Further, when the type of read/write request is sequential write, a control method is executed where the storage apparatus 4 adjusts the stripe size according to the data transfer length.

When the type of read/write request is sequential write, a control method is executed where the host system 2 changes the data transfer length based on the data length change program 23.

When the type of read/write request is sequential write, a control method is executed where the data is preferentially destaged to the hard disk drive 110 according to the performance threshold value designated by the user.

When the type of read/write request is random read, a control method is executed where the storage apparatus 4 reads into the cache memory 9 data to be stored in the storage area of the hard disk drive 110 in which subsequent reading is predicted based on the access pattern.

When the type of read/write request is random read, a control method is executed where the storage apparatus 4 collectively stores, during its spare time, data that is frequently read at a single location. This control method includes the migration of the RAID level.

When the type of read/write request is random read, a control method is executed where the host system 2 changes the data transfer length based on the data length change program 23, and optimizes the length and number of tags of the data length.

When the type of read/write request is random write, a control method is executed where the storage apparatus 4 collectively stores, at a single location, data that is frequently overwritten and stored in different storage areas of the hard disk 110, or distributes the a plurality of hard disk drives in order to increase the write speed. This control method includes the migration of the RAID level.

When the type of read/write request is random write, a control method is executed where the storage apparatus 4 optimizes the stripe size.

When the type of read/write request is random write, a control method is executed where the host system 2 changes the data transfer length based on the data length change program 23.

(4) Effect of First Embodiment

According to this embodiment, since the storage controller is able analyze the access pattern from a host system to a logical volume and perform optimal control for the relevant processing, it is possible to seek improvement in performance of the storage system even based on the particularity of access patterns.

(5) Second Embodiment

The storage system according to the second embodiment is explained below.

FIG. 21 shows the overall storage system 1' according to the second embodiment. The storage system 1' is configured by a host system 2 being connected to a storage apparatus 4' via a network 3, the storage apparatus 4' being connected to a management terminal 12, and the management terminal 12 being connected to a support system 14 via a network 13.

The storage apparatus 4' is a storage controller comprising a controller 5' for controlling the input and output of data to and from the host system 2, and a hard disk drive unit 11 for storing data from the host system 2.

The controller 5' is configured by a host computer interface (indicated as host computer I/F in the drawings) 60 for performing communication control with the host system 2, a processor 6', a shared memory 7, a cache memory 9, and a disk interface (indicated as disk I/F in the drawings) 10' for performing communication control with the hard disk drive unit 11 being connected via a transfer control circuit 8'.

The processor 6' refers to the various tables 91, 93, 94 stored in the cache memory 9 and executes the various programs 90, 92, 95, 96.

The transfer control circuit 8' is a circuit for controlling the data transfer among the host computer interface 60, the processor 6', the shared memory 7, the cache memory 9 and the disk interface 10'.

Incidentally, the other constitutional elements are the same as the corresponding constitutional element described above, and the explanation thereof is omitted. Further, although only one controller 5' is indicated in this embodiment, a plurality of controllers 5' may be provided in the storage apparatus 4'.

Even with the foregoing configuration, since the storage controller is able analyze the access pattern from a host system to a logical volume and perform optimal control for the relevant processing, it is possible to seek improvement in performance of the storage system even based on the particularity of access patterns.

(6) Other Embodiments

Although the plurality of host systems 2 or the plurality of applications A to C included in addition unit in the driver 21 for adding an identifier that identifies the respective host systems or the respective applications to the access information and sending such identifier, the addition unit may be configured as a separate hardware configuration.

Although the storage apparatus (storage controller) 4 provided the analysis unit for identifying the host system 2 or the applications A to C based on the identifier contained in the access information and analyzing an access pattern of access information sent from the identified host system or application; the management unit for managing the identifier of the host system 2 or the applications A to C, the analysis result of the access pattern analyzed with the analysis unit, and a control method for controlling the processing of data to be sent from a host system based on the analysis result or data to be stored in a logical volume; and the data processing controller for controlling the processing of data to be sent from a host system or data to be stored in a logical volume according to the control method managed by the management unit in the cache memory 9, the analysis unit, the management unit and the data processing controller may also be provided as a separate hardware configuration.

The present invention can be broadly applied to storage systems having one or more storage controllers, or to various other storage systems.

What is claimed is:

1. A storage system comprising:
   a plurality of physical disks storing data;
   a storage controller providing a logical volume prepared on the plurality of physical disks and analyzing an access pattern of an access request to the logical volume from a host system or an application in the host system; and
   a memory storing access pattern table;
   wherein the storage controller selects a control method according to the analyzed access pattern, and monitoring processing of the access request based on the selected control method;
   wherein if the processing of the access request is improved by the selected control method, the storage controller stores relationships among an identifier of the host system or the application, the logical volume, the analyzed access pattern and the selected control method in the access pattern table;
   wherein the storage controller controls processing of the access request to the logical volume from the host system or the application by referring to the access pattern table; and
   wherein when the analyzed access pattern is that an access cycle comprised by writing data and then reading data and then writing data, the storage controller selects a first control method for destaging data from a cache memory after performing the access cycle.

2. The storage system according to claim 1, wherein the storage controller identifies the host system or the application based on an identifier contained in the access request and analyzes the access pattern of the access request to the logical volume from the identified host system or the identified application in the host system.

3. The storage system according to claim 1, wherein the storage controller determines whether the control method for the access request from the host system or the application to the logical volume is not stored in the access pattern table; and
   wherein the storage controller controls processing of the access request by a control method determined by the storage controller in case the control method is not stored in the access pattern table.

4. The storage system according, to claim 2, wherein the identifier is a host computer identifier for identifying the host computer or an application identifier for identifying the application.

5. The storage system according to claim 1, wherein when the analyzed access pattern is a sequential write access, the storage controller selects a second control method for accumulating data sent from the host system in a different area in a cache memory and writes accumulated data to the logical volume.

6. The storage system according to claim 1, wherein when the analyzed access pattern is a sequential read access, the storage controller selects a third control method for prefetching certain amounts of data, which is sent to the host system from the logical volume to a cache memory.

7. A control method of a storage system, the method comprising:
   storing data performed by a plurality of physical disks;
   providing by a storage controller, a logical volume prepared on the plurality of physical disks and analyzing an access pattern of an access request to the logical volume from a host system or an application in the host system; and storing by a memory, an access pattern table;

wherein the storage controller selects a control method according to the analyzed access pattern, and monitoring processing of the access request based on the selected control method;

wherein if the processing of the access request is improved by the selected control method, the storage controller stores relationships among an identifier of the host system or the application, the logical volume, the analyzed access pattern and the selected control method in the access pattern table;

wherein the storage controller controls processing of the access request to the logical volume from the host system or the application by referring the access pattern table; and wherein when the analyzed access pattern is that an access cycle comprised by writing data and then reading data and then writing data, the storage controller selects a first control method for destaging data from a cache memory after performing the access cycle.

8. The control method of a storage system according to claim 7, wherein the storage controller identifies the host system or the application based on an identifier contained in the access request and analyzes the access pattern of the access request to the logical volume from the identified host system or the identified application in the host system.

9. The control method of a storage system according to claim 7, wherein the storage controller determines whether the control method for the access request from the host system or the application to the logical volume is not stored in the access pattern table; and wherein the storage controller controls processing of the access request by a control method determined by the storage controller in case the control method is not stored in the access pattern table.

10. The control method of a storage system according to claim 8, wherein the identifier is a host computer identifier for identifying the host computer or an application identifier for identifying the application.

11. The control method of a storage system according to claim 7, wherein when the analyzed access pattern is a sequential write access, the storage controller selects a second control method for accumulating data sent form the host system in a different area in a cache memory and writes accumulated data to the logical volume.

12. The control method of a storage system according to claim 7, wherein when the analyzed access pattern is a sequential read access, the storage controller selects a third control method for prefetching certain amount of data, which is sent to the host system from the logical volume to a cache memory.

* * * * *